Dec. 14, 1943. R. G. ALLEN 2,336,830
SELECTIVE CONTROL MECHANISM
Filed Aug. 20, 1941 5 Sheets-Sheet 5
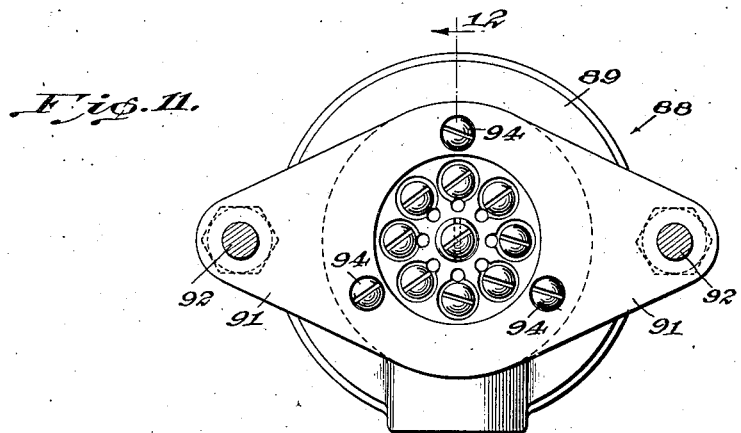
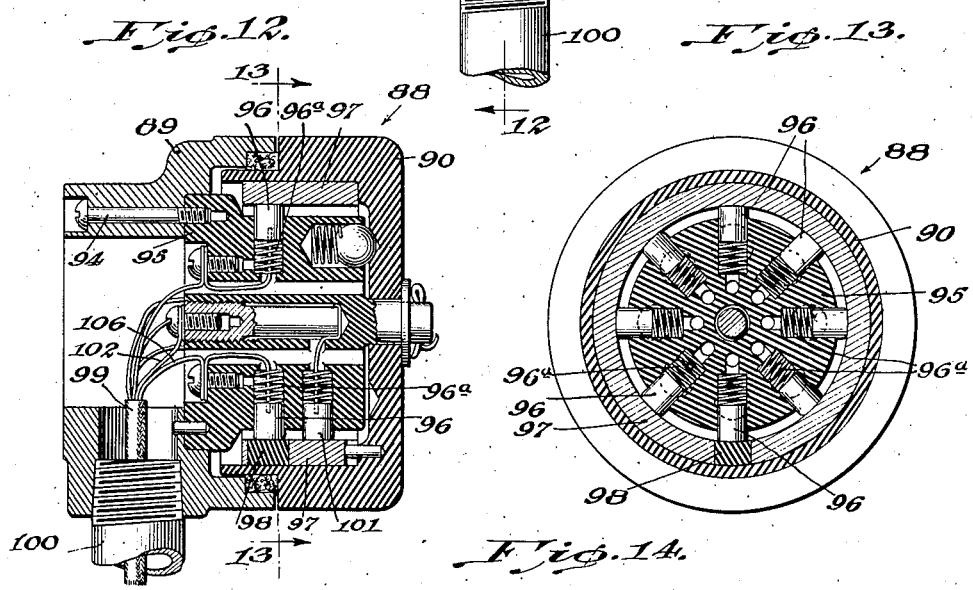
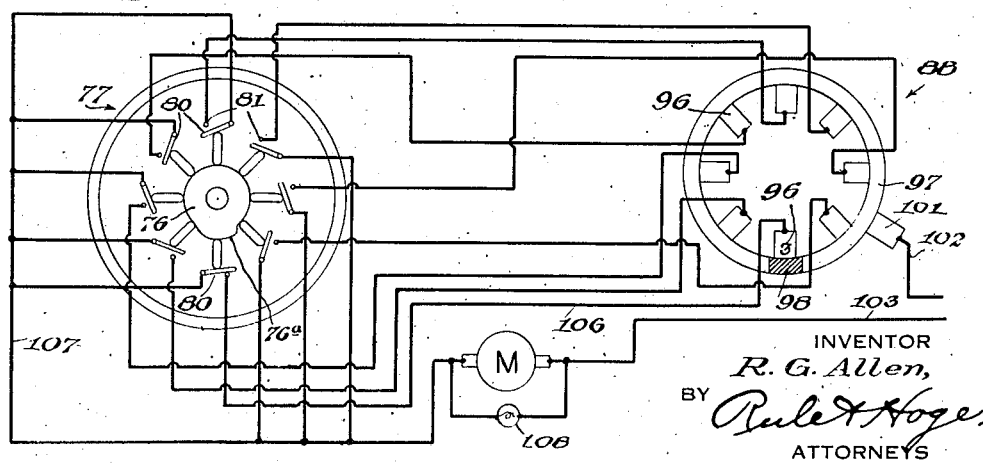
INVENTOR
R. G. Allen,
BY
ATTORNEYS Patented Dec. 14, 1943

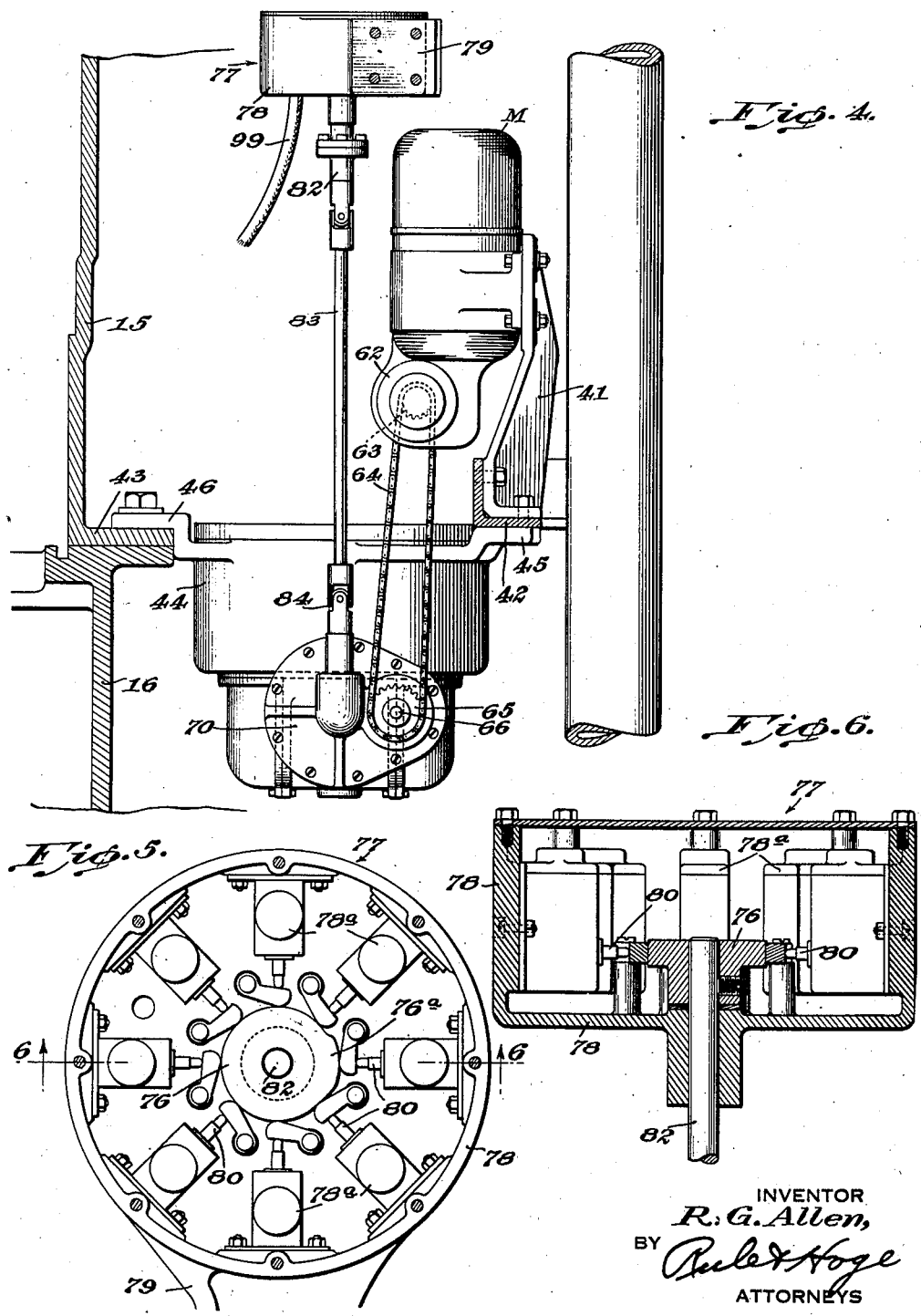

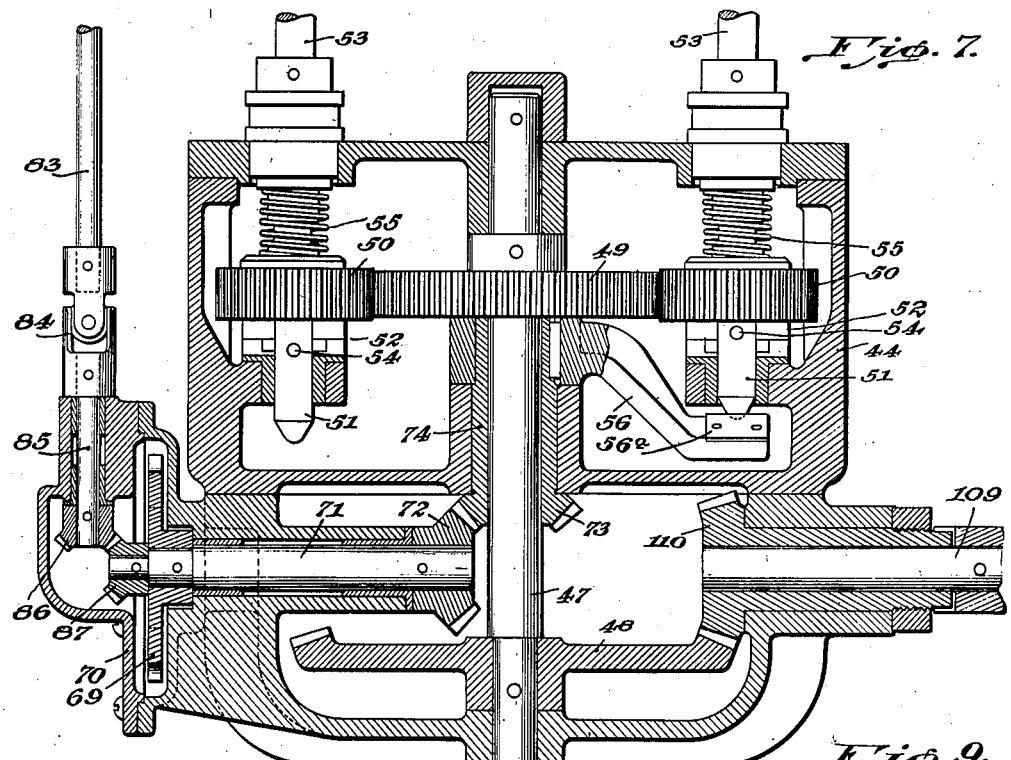
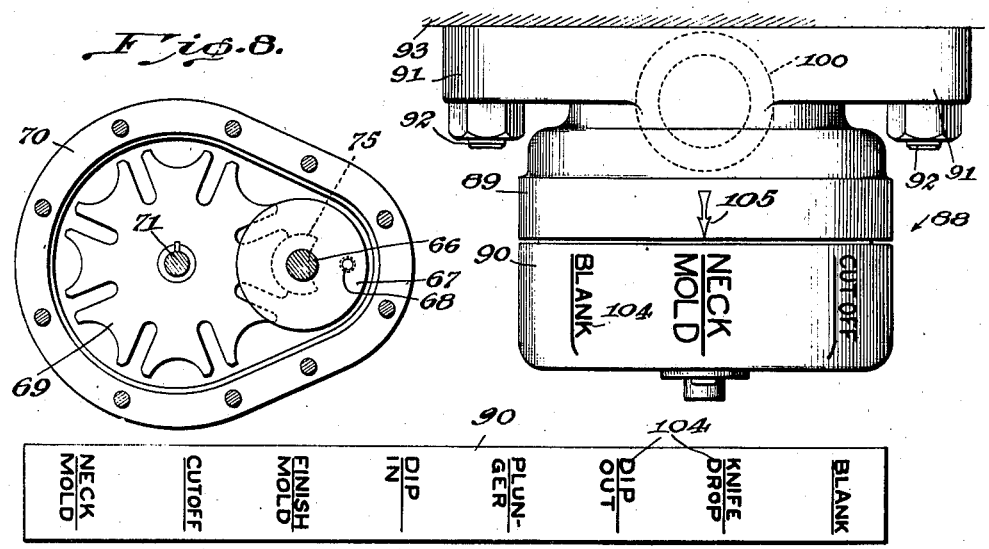

2,336,830

UNITED STATES PATENT OFFICE 2,336,830

SELECTIVE CONTROL MECHANISM

Russell G. Allen, Alton, Ill., assignor to Owens-Illinois Glass Company, a corporation of Ohio Application August 20, 1941, Serial No. 407,617

14 Claims. (Cl. 192—142)

My invention relates to selective mechanism designed to select and actuate any one of a series of devices such as devices or mechanisms for individually adjusting any one of a number of cams. The invention as herein disclosed is designed and adapted for use in selectively adjusting cams on an automatic glass blowing machine of the Owens suction type.

In the U. S. patent to Allen et al., 1,981,937, November 27, 1934, there is disclosed a machine of this type provided with adjusting devices individual to various cams on the machine, and selective setting mechanism by which the apparatus is set to operate any selected cam. Such setting means comprises a shaft provided with a hand crank for operating the selective means through mechanical connections. The present invention is in the nature of an improvement on the mechanism shown in said patent.

An object of the invention is to provide a manually operated selector device which may be located at any convenient point or position relative to the cam adjusting mechanism and operating devices.

A further object is to provide a novel manually operated selector device electrically connected with a distributor device which in turn operates to connect an electric motor with any selected cam adjusting mechanism.

Other objects of the invention will appear hereinafter.

Referring to the accompanying drawings:

Fig. 4 is a sectional elevation of mechanism shown in Fig. 2.

Fig. 5 is a plan view of the distributor, the cover of the distributor casing being removed.

Fig. 6 is a sectional elevation at the line 6—6 on Fig. 5.

Fig. 7 is a sectional elevation taken at the line 7—7 on Fig. 3 showing transmission gearing.

Fig. 8 is a sectional elevation of the Geneva gearing taken on line 8—8 of Fig. 3.

Fig. 9 is a plan view of a manual selector and indicator.

Fig. 10 is a view showing a development of the hand operated selector knob of Fig. 9.

Fig. 11 is a rear elevation of the selector.

Fig. 12 is a section at the line 12—12 on Fig. 11.

Fig. 13 is a section at the line 13—13 on Fig. 12.

Fig. 14 is a wiring diagram of the electric motor, distributor, selector and control circuits.

Figure 1:
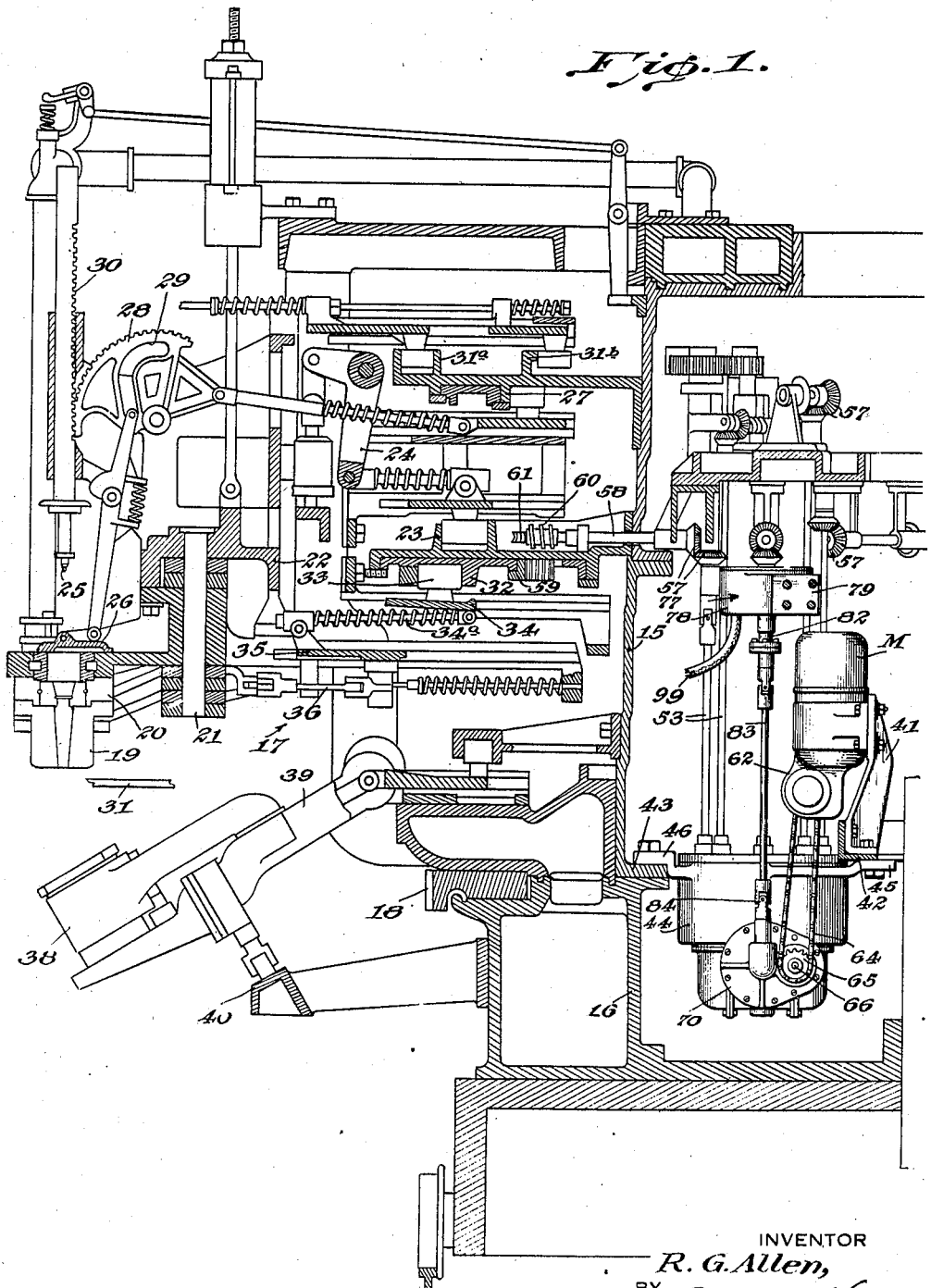
Fig. 1 is a sectional elevation of a glass blowing machine to which the present invention is applied, a portion of the machine being broken away.

Referring to Fig. 1, I have illustrated in sectional elevation one unit of a suction gathering glass blowing machine of the Owens type such as shown in the above mentioned Patent, 1,981,937, and the prior art referred to therein, to which reference may be had for a full disclosure of the machine and its operation. Briefly, the machine comprises a stationary center column 15 mounted on a base 16, a carriage 17 mounted for continuous rotation about the column 15 and driven by an electric motor having operating connections therewith including a ring gear 18 on the carriage, a series of heads or units which rotate with the carriage and are arranged in an annular series thereon, each said unit including a suction gathering mold comprising a body blank mold 19 and a neck mold 20, and devices coacting with the mold in the glass gathering and blowing operations.

The molds are made in sections carried on arms mounted to swing about a pivot pin 21 for opening and closing the molds. Each blank mold is carried on a dip frame 22 which is periodically lowered and lifted by a stationary cam 23 operating through connections including a bell crank 24. The cam 23 is formed on a cam plate which is one of a number of stationary cam plates mounted on the center column 15 and provided with cams for effecting the various operations including opening and closing of the molds, lifting and lowering of the dip frames, lifting and lowering of a plunger 25 which forms the initial blow opening in the parison, actuating a slide valve 26 controlling the supply of air under pressure for blowing the parison, and operating the knife mechanism for severing the glass at the lower end of the blank mold.

The plunger 25 and valve 26 are operated by a stationary cam 27 operating through a segment 28 formed with a cam 29 for actuating the slide valve and provided with rack teeth for operating a rack bar 30 carrying the plunger. The swinging movements of the knife 31 and its lifting and lowering movements are controlled by cams $31^a$ and $31^b$. The opening and closing movements of the blank mold are controlled by a cam 32 on which runs a cam roll 33 on a slide 34 movable in guides extending radially of the mold carriage, said slide connected through a link $34^a$ to a slide 35 having operating connections 36 to the blank mold carrying arms.

The cam 32 is adjustable circumferentially of the machine for adjustably varying the time of opening and closing the blank mold, the cam 32 being one of the cams which are selectively adjustable by means of an electric motor M having operating connections with the various cam adjusting devices through trains of gearing individual to said cams. Such mechanism is in the main substantially like mechanism disclosed and fully described in the above identified patent to Allen et al., 1,981,937, but under the control of novel selecting mechanism embodied in the present invention and fully described hereinafter.

Finishing molds 38 individual to the blank molds are connected to rotate with the mold carriage, being mounted on arms 39 which are lifted and lowered by a stationary cam track 40 for bringing the finishing mold into position to enclose the parison suspended from the neck mold when the blank mold is opened, the parison being blown to finished form within the finishing mold.

The motor M is carried on a bracket 41 bolted to an angle bar 42 which extends horizontally across the interior of the column 15 and which may be supported on a flange 43 of said column. A gear case 44 positioned beneath the motor is formed with arms 45 and 46 bolted respectively to the angle bar 42 and flange 43. Within the gear case 44 is journalled a vertical drive shaft 47 (Fig. 7) to which is keyed a bevel gear 48 and a spur gear 49. The gear 49 forms the driving gear of a planetary gear system including an annular series of pinions 50 running in mesh with the gear 49. Each pinion 50 is mounted to rotate idly on a center shaft 51 but is adapted to be connected through a clutch 52 to said shaft for rotating the latter and, through suitable driving connections, operating a cam adjusting mechanism. The pinions 50 are individual to and operatively connected through the clutches to the several cam operating mechanisms for operating the cams which, as heretofore described, control the various operations of the machine.

Each shaft 51 has a splined connection with a vertical shaft 53, permitting up and down movement of the shaft 51 for connecting and disconnecting the pinion 50, the clutch sections being connected through a driving pin 54 when the shaft 51 is lifted. Coil springs 55 hold the shafts 51 in their lowered position with the clutch members disconnected except when a shaft is cammed upward by a selector arm 56. Said arm is rotatable about the axis of the shaft 47 in the manner hereinafter described and carries a cam plate 56a for engaging and lifting the shafts 51 in succession.

Each of the shafts 53 (Figs. 7 and 1) has a driving connection through a pair of beveled gears 57 with a horizontal shaft 58 which extends through an opening in the wall of the column 15. As shown in Fig. 1, the cam 32, which controls the opening and closing of the blank mold, is operatively connected with one of the shafts 58 for adjustment of the cam in a direction circumferential of the machine by means of a rack 59 attached to the cam. A worm 60 on the shaft 58 drives a worm gear 61 having a driving connection through a vertical shaft and pinion with the rack 59. Similar driving connections are provided between each of the shafts 53 and cams individual thereto as shown and described in detail in the above mentioned patent. The selector arm 56 (Fig. 7) is driven by the electric motor M operating through gearing which will now be described.

Figure 3:
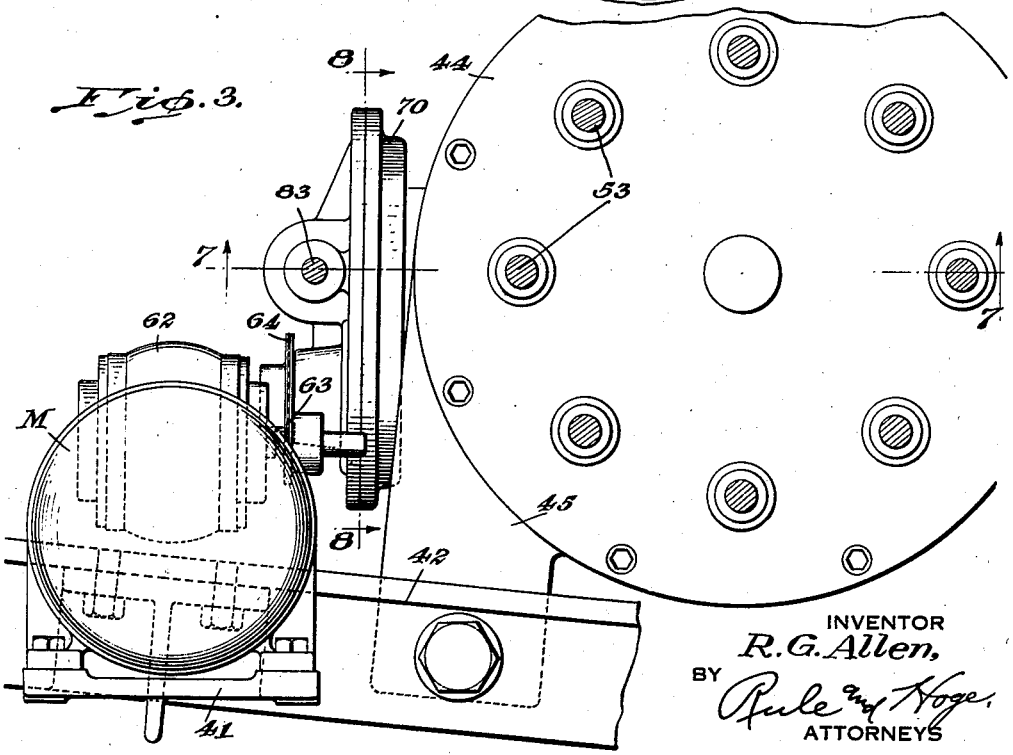
Fig. 3 is a view similar to Fig. 2 but on a larger scale, the section being at a plane below the distributor.

Referring to Figs. 3 and 4, the motor operates through speed reduction gearing contained within a gear housing 62 to drive a sprocket shaft and sprocket wheel 63, the latter having driving connection through a sprocket chain 64 with a sprocket wheel 65 keyed to a shaft 66 (Figs. 4 and 8). The shaft 66 has secured thereto a disk 67 carrying a pin 68 which serves as the driving element for a Geneva gear wheel 69. The Geneva gear mechanism is housed within a casing 70. The Geneva gear 69 is keyed to a shaft 71 to which is also keyed a bevel gear 72 (Fig. 7) running in mesh with a gear 73 on a tubular shaft 74 surrounding the shaft 47 on which it is rotatively mounted. The selector arm 56 is keyed to the shaft 74. It will be seen that when the motor M is running, it operates through the connections just described to rotate the planetary gear 49 intermittently step by step. The gearing is so proportioned that each such step rotation advances the selector arm 56 an angular distance corresponding to the distance between each two adjacent shafts 51. Also, said selector arm is so positioned that it always holds one of the shafts 51 in its lifted position when the Geneva wheel 69 is at rest and held locked by its interlocking engagement with the holding element 75 on the disk 67.

Figure 2:
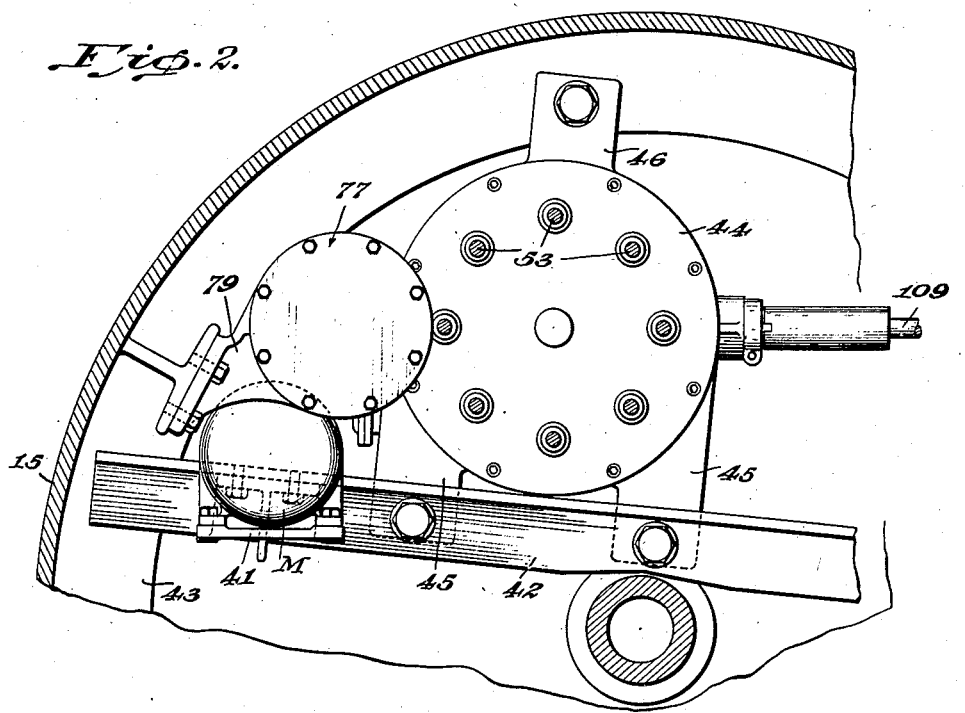
Fig. 2 is a sectional plan view on a larger scale showing a portion of the stationary center column and the selective mechanism mounted therein, including the motor, a distributor and transmission mechanism.

The motor M also operates through the Geneva drive to impart a step by step rotation to a distributor cam 76 (Figs. 5, 6 and 14) forming part of a distributor device 77. This device comprises a casing 78 formed with an arm 79 (Figs. 1 and 2) by which it is bolted to the column 15. Within the casing 78 and bolted thereto are switch boxes 78a arranged in an annular series, each box containing a switch comprising a movable contact 80 and a stationary contact 81 (Fig. 14). The cam disk 76 is keyed to a vertical shaft 82. A vertical shaft 83 is connected at its upper end through a universal joint with the shaft 82 and at its lower end is connected through a universal joint 84 to a shaft 85 (see Fig. 7) journalled within the housing 70 and having a driving connection through a pair of bevel gears 86 and 87 with the shaft 71. It will be seen that when the motor M is running, it operates through the train of gearing just described to rotate the distributor cam 76 step by step in synchronism with the step by step rotation of the selector arm 56.

Means will now be described for starting the motor, controlling its operation and automatically stopping it when the selector arm 56 has been brought to a position corresponding to a selected cam which it is desired to adjust. Such means includes a selector 88 (Figs. 9 to 14) comprising a series of electrical contacts enclosed in a casing consisting of a stationary part 89 and a knob 90 rotatable by hand for setting the selector. The selector is located at any convenient position and may, if desired, have a separate mounting from the blowing machine as by means of arms 91 formed on the section 89 and bolts 92 by which it is secured to any suitable support or backing 93 (Fig. 9). Secured to the section 89 by means of screws 94 is a substantially cylindrical block 95 made of insulating material in which are mounted electrical contacts 96 arranged in an annular series. The contact pieces 96 are held in engagement with a contact ring 97 by means of coil springs 96a. The ring 97 is secured to the knob 90 for rotation therewith and includes an insulating plug or piece 98 which may be aligned with each of the contacts 96 in succession by rotation of the hand knob 90. The contacts 96 as shown in Fig. 14 are connected individually in circuit with corresponding stationary switch contacts 81 of the distributor. The movable switch contacts 80 are connected to one terminal of the motor M.

The conductors leading from the selector 88 to the distributor 77 are grouped together in a cable 99 within a conduit 100 (Figs. 12 and 1) extending from the selector to the distributor. The selector in addition to the annular series of contacts 96 includes contact 101 also mounted in the block 95 but out of the path of the insulating patch 98. The contact 101 is connected to one main 102 in a power circuit, the other main 103 being connected directly to one terminal of the motor M.

The knob 90 (Figs. 9 and 10) is provided with indicating markings or legends 104 which may be selectively brought into line with an arrow 105 on the stationary part 89 which indicates the setting of the knob for any selected cam which it is desired to adjust. Thus, as indicated in Fig. 9, the knob is set preparatory to adjustment of the cam controlling the opening of the neck mold.

The operation is as follows: Fig. 14 shows the parts in a position of rest with the motor circuit open. It will be noted that all of the switch contacts 80 of the distributor are in open position except the one opposite the cam lobe 76ª of the cam disk 76. The contact 3 of the selector 88 which corresponds to the closed switch 80 and is connected thereto through a conductor 106, is in engagement with the insulating patch 98. Thus, all the conductors leading from the main 102 through the selector and distributor are in open circuit so that the motor is at rest.

To start the motor the operator turns the knob 90 to bring it to a position corresponding with the cam which is to be adjusted. The initial movement of the knob carries the insulating plug 98 beyond the contact 3 so that a circuit is established for the motor. Said circuit may be traced from the main 102 through contact 101, ring 97, contact 3, conductor 106, closed switch 80 of the distributor, conductor 107 and motor M to main 103. The motor is thus started and operates to rotate the cam 76 in a clockwise direction (Fig. 14). The cam lobe 76ª thus closes the switches 80 in succession, each switch being closed before the preceding one is released so that the motor circuit is maintained, being established through the distributor contacts in succession. The motor continues to operate the distributor step by step until the switch 80 corresponding to the selected cam is closed and the preceding switch 80 is opened. At this time the insulating plug 98 is opposite the selector contact 96 corresponding with the indicated position of the selector knob (Fig. 9), which contact 96 is connected with the said closed contact 80. The motor circuit is thus opened, thereby stopping the motor.

When the motor is thus stopped, the selector arm 56 (Fig. 7) has been brought to position to connect the clutch 52 corresponding to the selected cam, all the other clutches 52 being disconnected. A signal light 108 (Fig. 14) connected across the terminals of the motor indicates when the motor has stopped. The operator now turns a crank shaft 109 (Figs. 2 and 7) to which is secured a bevel pinion 110 running in mesh with the gear 48 and thereby rotates the planetary gear 49 and pinion 50 which is connected to drive the selected cam, thereby adjusting the cam in either direction depending on the direction of rotation of the crank.

Modifications may be resorted to within the spirit and scope of my invention.

I claim:

1. The combination of a plurality of adjustable cams, a manual selector device comprising an element movable to positions individual to said cams, indicating means to indicate the position of adjustment of said selector device for any selected cam, means for individually adjusting the cams comprising a driving element and gear trains individual to the cams, an electric motor, means actuated thereby for effecting a driving connection between said driving element and the said gear trains singly and in succession, and means controlled by said selector device for automatically stopping the motor when a driving connection has been established for adjusting the selected cam indicated by the said indicating means.

2. The combination of a plurality of adjustable cams, a driving element, driven elements individual to the cams and operatively connected to the cams for adjusting them, a selector device operable to effect a driving connection between said driving element and the said driven elements singly and in succession, a motor, and transmission mechanism between the motor and said selector device comprising means operable to move the selector device intermittently step by step while the motor is running continuously.

3. The combination of a plurality of adjustable cams, a driving element, driven elements individual to the cams and operatively connected to the cams for adjusting them, a selector device operable to effect a driving connection between said driving element and the said driven elements singly and in succession, a motor, and transmission mechanism between the motor and said selector device comprising means operable to move the selector device intermittently step by step while the motor is running continuously, said parts being so arranged that the driving connection is maintained between the driving element and a said driven element while the selector device is at rest after each step movement.

4. The combination of a plurality of adjustable cams, a driving gear, pinions individual to said cams, operating connections between the pinions and the cams, an electric motor, a selector device, power transmission mechanism between the motor and said selector device, and means operable by said selector device to establish a driving connection of said driving gear with the pinions singly and in succession, said transmission mechanism including means for driving the selector device intermittently step by step and maintaining a driving connection between a said pinion and the driving gear while said selector device is at rest after each step movement.

5. The combination of a plurality of adjustable cams, mechanisms individual to said cams and operatively connected thereto for adjusting the cams, a driving element, a selector device operable to establish driving connections between said driving element and the individual mechanism for driving a selected cam, an electric motor, driving connections between the motor and said selector device, means for controlling the operation of the motor including a distributor comprising switches individual to said cams and means for operating the switches in succession, and a manual selector device controlling circuits through said switches and operable to open the motor circuit and stop the motor when operating connections have been established between said driving element and the driving means for a selected cam.

6. The combination of a plurality of adjustable cams, mechanism including a driving element for adjusting said cams, a selector device operable to establish driving connections between said driving element and any selected cam, an electric motor, driving connections between the motor and said selector device, and control mechanism for the motor including a distributor and a manually operable selector, electrical circuits individual to said cams, said circuits being connected in parallel with each other and in series with the motor, said distributor including switches in said parallel circuits and individual thereto, said manual selector including electrical contacts in and individual to said parallel circuits, said contacts arranged in series with the corresponding switches in the distributor, and means driven by the motor for closing the distributor switches in succession and thereby maintaining an operating circuit through the motor, said manually operable selector device including means for breaking the circuit through the motor when said rotating element of the distributor reaches a position corresponding to the selected cam.

7. The combination with a machine comprising a hollow center column, a carriage mounted to rotate about said column, stationary cams, and mechanisms on the carriage controlled and actuated by said cams during the rotation of the carriage, of means for individually and selectively adjusting said cams including adjusting mechanisms mounted within said column and having operating connections with the cams, a driving element, an electric motor, selective means actuated thereby for selectively connecting the driving element to said adjusting mechanisms, a manually operable selector mounted externally of said column, and electrical control means actuated by said manual selector for controlling the operation of the motor.

8. The combination of a plurality of adjustable cams, mechanisms individual to said cams for adjusting the cams, an electric motor, a driving element, means operated by the motor to effect driving connections between the driving element and the said adjusting mechanisms singly and in succession, a manual selector device including a stationary part and a part rotatable to indicating positions individual to said cams, a conducting ring connected to rotate with one of said parts, an annular series of electrical contacts carried by the other said part and held in engagement with said ring, the contacts of said series being individual to the cams, means providing circuit connections between said contacts and the motor, insulating means carried by one of said parts for breaking the circuits through said contacts in succession by the relative rotation of said parts, and means for opening the motor circuit when an operating connection has been established between the driving element and a selected cam adjusting mechanism corresponding to the indicating position to which the rotatable part of the selector device has been adjusted.

9. In combination, adjustable cams, rotatable shafts individual to the cams, means whereby rotation of each shaft adjusts the operating position of the corresponding cam, pinions individual to said shafts, a driving gear meshing with said pinions, clutches individual to said pinions and providing driving connection between the pinions and corresponding shafts, a power motor, means actuated by the motor for operating clutches individually in succession, a manually operable selector device movable to predetermined positions individual to said cams, and means actuated by the selector device for controlling the operation of the motor and operable to cause the automatic stopping of the motor when the clutch corresponding to the position of the selector device has been operated.

10. In combination, a series of adjustable cams, a series of shafts individual to the cams, means whereby rotation of the shafts adjusts the operating positions of the cams, pinions individual to said shafts, a driving gear meshing with said pinions, clutches individual to said pinions and providing driving connections between the pinions and the corresponding shafts, a cam selecting device including means for throwing the clutches in and out one at a time, a motor, operating connections between the motor and said selecting device, and manual selective means for effecting an automatic stopping of the motor when the clutch corresponding to the selected cam is operated.

11. Cam selecting and adjusting mechanism comprising a driving gear, an annular series of pinions meshing with said gear, shafts individual to the pinions, clutches individual to said pinions and adapted to provide driving connections between the pinions and corresponding shafts one at a time, a selective device rotatable about the axis of said driving gear and operable to throw in the clutches one at a time, cams individual to the shafts, means whereby rotation of said shafts adjusts the operating positions of the cams, a power motor, operating connections between the motor and said selector device, and manual selecting means for controlling the motor and operable to cause the motor to stop automatically when said selector device throws in the clutch corresponding to a selected cam.

12. In combination, a plurality of cams, cam selecting and adjusting devices including shafts individual to and operatively connected to the cams, pinions individual to the shafts, a driving gear for rotating said pinions, means for establishing driving connections between the pinions and corresponding shafts one at a time, said last mentioned means comprising an electric motor, and a manual selector device operable to start the motor and cause it to stop automatically when a said driving connection has been established between a pinion and its shaft corresponding to a selected cam.

13. The combination of a plurality of cams, shafts individual to the cams, means whereby rotation of said shafts adjusts the operating positions of said cams, a driving element, a motor, a selector device operatively connected to the motor, means actuated by said selector device for effecting an operating connection between said driving element and the shaft individual to a selected cam, and manual means for selectively controlling the operation of the motor.

14. The combination of a plurality of cams, shafts individual to the cams, means whereby rotation of said shafts adjusts the operating positions of said cams, clutches individual to the shafts, a driving element operable through said clutches to drive the shafts, a motor, means operated by the motor for positioning the clutches one at a time in succession to establish driving connections between the corresponding shaft and said driving element, and manually operated selective means operable to effect the automatic stopping of the motor when driving connections have been established for a selected cam.

RUSSELL G. ALLEN.